United States Patent [19]

Lundberg et al.

[11] Patent Number: 4,738,997

[45] Date of Patent: Apr. 19, 1988

[54] ASPHALT BLENDS BASED ON POLYMER COMPLEXES

[75] Inventors: Robert D. Lundberg, Bridgewater; Ilan Duvdevani, Leonia; Dennis G. Peiffer, East Brunswick, all of N.J.

[73] Assignee: Exxon Research and Engineering Company, Florham Park, N.J.

[21] Appl. No.: 807,674

[22] Filed: Dec. 11, 1985

[51] Int. Cl.⁴ .............................................. C08L 95/00
[52] U.S. Cl. ........................................ 524/68; 524/70; 524/71
[58] Field of Search ............................ 524/70, 71, 68

[56] References Cited

U.S. PATENT DOCUMENTS

| | | | |
|---|---|---|---|
| 4,362,828 | 12/1982 | Agarwal et al. | 524/70 |
| 4,371,640 | 2/1983 | Agarwal et al. | 524/71 |
| 4,371,641 | 2/1983 | Boyer et al. | 524/70 |
| 4,387,172 | 6/1983 | Agarwal et al. | 524/71 |
| 4,591,611 | 5/1986 | Jenkins et al. | 524/71 |

*Primary Examiner*—Allan M. Lieberman
*Attorney, Agent, or Firm*—Richard E. Nanfeldt

[57] ABSTRACT

A bitumen-containing composition which comprises;
(a) bitumen;
(b) about 0.5 to about 30 parts by weight of a polymer complex per 100 parts by weight of the bitumen; and
(c) about 0 to about 100 parts by weight of a filler per 100 parts by weight of the bitumen.

8 Claims, No Drawings

ASPHALT BLENDS BASED ON POLYMER COMPLEXES

This invention relates to bitumen compositions which contain bitumen, polymer complexes and fillers which modify the properties of bitumen.

Various industries, especially the roofing industry, require bitumen which has a good resistance to creep, as well as having elastic properties. In the past polymers (usually styrene-butadiene copolymers) have been added to bitumen to achieve these properties. However, such blends have been found to have marginal compatability, a reduced stability towards oxidation and are sensitive to U.V. radiation, with the result that they age rather quickly.

Asphalt is widely employed as a reinforced roofing composition, as pavement binder and in numerous other applications where its thermoplastic nature is useful. In addition, its ability to bind aggregates to form systems of low cost and outstanding weathering characteristics is highly desirable. Unfortunately, at room temperature or at lower temperatures asphalt becomes a very brittle material, meaning that its flexibility and resistance to impact is unsatisfactory. This later characteristic is especially important in designing roofing compositions that have appropriate elastic characteristics under extremely low temperature. A further limitation of asphalt is that at sufficiently high temperature there can be a significant amount of creep which, due to lack of elastic characteristics, does not adequately recover.

In recent years it has been discovered that polymer asphalt blends can circumvent some of the difficulties observed with simple asphalt mixes. Polymers, such as styrene butadiene, styrene block copolymers, selected ethylene copolymers or sulfonated EPDM polymers can adequately improve the elasticity of asphalt so that its low temperature properties are no longer marginal. Some of these features have achieved substantial commercial success. The best known polymer for modifying asphalt is the block copolymer based on styrene and butadiene. One of the major deficiencies of these block copolymers have been their limited weathering characteristics due to features in the polymer backbone. Therefore, these polymer asphalt blends under some conditions can lose their outstanding elasticity after sufficient outdoor exposure. Another problem is the possible depletion of aromatics from the asphalt oil phase by the styrene segments of the polymer. This can cause an imbalance in the suspension ability of asphaltenes, resulting in a nonhomogeneous blend.

This invention describes new polymer complexes suitable for modifying broad ranges of different asphalts. The polymer complexes are based on a sulfonate ionomer, either in neutralized or acid form. These systems, when complexed with an amine containing copolymer, result in a network that is intermolecular in nature, which can enhance low temperature elastomer properties and which would be flexible at high temperatures.

We have now discovered compositions which have good resistance to creep without having the above-mentioned disadvantages of the prior art compositions.

According to this invention, a bitumen-containing composition comprises bitumen, a filler and a minor proportion by weight of a polymer complex.

Bitumen, i.e., bituminous crude petroleum residue, is obtained by removal of volatile constituents of crude petroleum, usually by distillation. This distillation is normally conducted at atmospheric pressure, followed by reduced pressure treatment. The bituminous residue remaining after the reduced pressure treatment is referred to as a vacuum residue.

Bitumen is commonly classified by penetration grade. The penetration of bitumen is a measure of its resistance to deformation and is the depth, expressed in 0.1 mm, which a needle of standardized dimensions penetrates under standardized conditions into this bitumen. The values of the penetration mentioned in this specification are those determined by means of ASTM method D-5.

Bitumens having a penetration ranging from 5 to 200 at 25° C. may be regarded as relatively hard. Preferred bitumens for use in the compositions of this invention have penetration of 100 to 300 at 25° C., e.g., 200 at 25° C.

The penetration index of a bitumen indicates the temperature susceptibility of the penetration and is calculated from the slope of the decimal logarithm of the penetration versus the temperature in 0° C. The higher the penetration index the lower the temperature susceptibility. The compositions of this invention have greatly improved penetration index compared with the bitumen before the incorporation therein of the elastic polymer.

SUMMARY OF THE INVENTION

The instant invention relates to a blend composition of a bitumen, a polymer complex and a filler wherein the concentration level of the polymer complex is about 0.5 to about 30 parts by weight per 100 parts by weight of the bitumen, more preferably about 1 to about 20, and the concentration level of the filler is less than about 100 parts by weight per 100 parts of the bitumen, more preferably about 10 to about 50.

Accordingly, it is an objective of the instant invention to provide an improved roofing material which has excellent stability towards oxidation, is U.V. stable and has good resistance to creep.

GENERAL DESCRIPTION OF THE INVENTION

The instant invention relates to a blend composition of a bitumen, a polymer complex and a filler wherein the concentration level of the polymer complex is about 0.5 to about 30 parts by weight per 100 parts by weight of the bitumen, more preferably about 1 to about 20, and the concentration level of the filler is less than about 100 parts by weight per 100 parts of the bitumen, more preferably about 10 to about 50.

The polymer complexes of the instant invention are acid form or neutralized sulfonated polymers complexed with an amine-containing polymer.

The polymer complexes are formed by blending together the sulfonated polymers with the polymers containing basic nitrogen atoms. Obviously these polymer blends are generally composed of at least two different polymers in which the polymer backbone containing sulfonate groups (or carboxylate and phosphonate) is of a different chemical composition than that of the polymer chain containing basic nitrogen atoms. Specific examples of preferred polymers are described below.

The substantially linear nitrogen-containing synthetic polymers suitable for use in the process of this invention include both addition polymerization polymers, e.g., styrene, vinyl chloride and acrylic copolymers, and polycondensation polymers, such as polyamides, and obviously exclude naturally occurring nitrogen-containing materials, such as proteins and the condensation products of formaldehyde with urea or melamine. When the nitrogen-containing polymers are addition polymerization polymers it is preferred that they be copolymers of a minor polar percent, i.e., not more than 50 molar percent, of monomers containing basic nitrogen atoms or amide nitrogen atoms. Examples of monomers containing the basic nitrogen atoms are 2-vinylpyridine, 4-vinylpyridine and N:N-dimethylaminoethyl methacrylate.

In general, the sulfonated polymer will comprise from about 4 meq. up to 200 meq. of groups per 100 g. of polymer, more preferably from about 10 meq. to about 100 meq. per 100 g. of polymer of pendant sulfonate groups. The sulfonated polymers utilized in the instant invention are acids or are neutralized with the elements selected from the group consisting of Groups IA, IIA, and more preferably transitoin elements form Groups IVA, VA, VIA, VIIA, VIIIA, IB and IIB of the Periodic Table of Elements and lead, tin and antimony. Sulfonated polymers which are subject to the process of the instant invention are illimitable and include both plastic and elastomeric polymers. Specific polymers include sulfonated polystyrene, sulfonated t-butyl styrene, sulfonated polyethylene, sulfonated polypropylene, sulfonated styrene/acrylonitrile copolymers, sulfonated styrene/methyl methacrylate copolymers, sulfonated block copolymers of styrene/ethylene oxide, acrylic acid copolymers with styrene, sulfonated butyl-rubber, sulfonated ethylene-propylene terpolymers, sulfonated polyisoprene and sulfonated elastomers and their copolymers.

The expression "Butyl rubber" as employed in the specification and claims is intended to include copolymers made from a polymerization reaction mixture having therein from 70 to 99.5% by weight of an isoolefin which has about 4 to 7 carbon atoms, e.g., isobutylene, and about 0.5 to 30% by weight of a conjugated multiolefin having from about 4 to 14 carbon atoms, e.g., isoprene. The resulting copolymer contains 85 to 99.8% by weight of combined isolefin and 0.2 to 15% of combined multiolefin.

Butyl rubber generally has a Staudinger molecular weight of about 20,000 to about 500,000, preferably about 25,000 to about 400,000, most preferably about 100,000 to about 400,000, and a Wijs Iodine No. of about 0.5 to 50, preferably 1 to 15. The preparation of Butyl rubber is described in U.S. Pat. No. 2,356,128, which is incorporated herein by reference. For the purposes of this invention, the Butyl rubber may have incorporated therein from about 0.2 to 10% of combined multiolefin, preferably about 0.5 to about 6%, more preferably about 1 to about 4%, e.g., 2%. Illustrative of such a Butyl rubber is Exxon Butyl 365 (Exxon Chemical Company), having a mole percent unsaturation of about 2.0% and a Mooney viscosity (ML, 1+3, 212° F.) of about 40–50. Low molecular weight Butyl rubbers, i.e., Butyl rubbers having a viscosity average molecular weight of about 5,000 to 85,000 and a mole percent unsaturation of about 1 to about 5% may be sulfonated to produce the polymers useful in this invention. Preferably, these polymers have a viscosity average molecular weight of about 25,000 to about 60,000.

The ethylene-propylene terpolymers (EPDM) are low unsaturated polymers having about 0.5 to about 15.0 weight percent olefinic unsaturation, more preferably about 1 to about 8, most preferably about 2 to 7, defined according to the definition as found in ASTM D-1418-64, and is intended to mean terpolymers containing ethylene and propylene in the backbone and a diene in the side chain. Illustrative methods for producing these terpolymers are found in U.S. Pat. No. 3,280,082, British Pat. No. 1,030,289 and French Pat. No. 1,3836,600, which are incorporated herein by reference. The preferred polymers contain about 40 to about 75 weight percent ethylene and about 1 to about 10 weight percent of a diene monomer, the balance of the polymer being propylene. Preferably, the polymer contains about 45 to about 70 weight percent ethylene, e.g., 50 weight percent, and about 2.0 to about 8.0 weight percent diene monomer, e.g., 5.0 weight percent. The diene monomer is preferably a nonconjugated diene. Illustrative of these nonconjugated diene monomers which may be used in the EPDM terpolymer are 1,4-hexadiene, dicyclopentadiene, 5-ethylidene-2-norbornene, 5-methylene-2-norbornene and methyl tetrahydroindene.

A typical EPDM is Vistalon 2504 (Exxon Chemical Company), a terpolymer having a Mooney viscosity (ML, 1+8, 212° F.) of about 40 and having an ethylene content of about 50 weight percent, and a 5-ethylidene-2-norbornene content of about 5.0 weight percent. The $\overline{M}_n$ of Vistalon 2504 is about 47,000, the $\overline{M}_v$ is about 145,000 and the $\overline{M}_w$ is about 174,000.

Another EPDM terpolymer, Vistalon 2504-20, is derived from Vistalon 2504 (Exxon Chemical Company) by a controlled extrusion process, wherein the resultant Mooney viscosity at 212° F. is about 20. The $\overline{M}_n$ of Vistalon 2504-20 is about 26,000, the $\overline{M}_v$ is about 90,000 and the $\overline{M}_w$ is about 125,000.

Nordel 1320 (Dupont Company) is another terpolymer having a Mooney viscosity at 212° F. of about 25 and having about 53 weight percent of ethylene, about 3.5 weight percent of 1,4-hexadiene and about 43.5 weight percent of propylene.

The EPDM terpolymers of this invention have a number average molecular weight ($\overline{M}_n$) of about 5,000 to about 200,000, preferably of about 10,000 to about 150,000, more preferably about 15,000 to about 100,000. The Mooney viscosity (M, 1+8, 212° F.) of the EPDM terpolymer is about 5 to about 60, more preferably about 10 to about 50, most preferably about 15 to about 40. The $\overline{M}_v$ of the EPDM terpolymer is preferably below about 450,000, more preferably below about 300,000. The $\overline{M}_w$ of EPDM terpolymer is preferably below about 500,000 and more preferably below about 350,000.

Suitable polystyrene polymers useful in forming the sulfonated polystyrene polymers have an $\overline{M}_n$ as measured by GPC of about 10,000 to about 500,000, more preferably about 20,000 to about 200,000 and most preferably about 50,000 to about 200,000.

In carrying out the process to prepare sulfonated polymers the polymer is dissolved in a non-reactive solvent, such as a chlorinated aliphatic solvent, chlorinated aromatic hydrocarbon, or an aliphatic hydrocarbon, such as carbon tetrachloride, dichloroethane, chlorobenzene, cyclohexane, pentane, isopentane, hexane, isohexane or heptane. The preferred solvents are the lower boiling aliphatic hydrocarbons. A sulfonating agent is added to the solution of the elastomeric polymer and non-reactive solvent at a temperature of about −100° C. to about 100° C. for a period of time of about 1 to about 60 minutes, more preferably at room temperature for about 5 to about 45 minutes, and most preferably about 15 to about 30 minutes. The typical sulfonating agents are described in U.S. Pat. Nos. 3,642,728 and 3,836,511, previously incorporated herein by reference. These sulfonating agents are selected from an acyl sulfate, a mixture of sulfuric acid and an acid anhydride or a complex of a sulfur trioxide donor and a Lewis base containing oxygen, sulfur or phosphorus. Typical sulfur trioxide donors are $SO_3$, chlorosulfonic acid, fluorosulfonic acid, sulfuric acid, oleum, etc. Typical Lewis bases are: dioxane, tetrahydrofurnal, tetrahydrothiophene or triethylphosphate. The most preferred sulfonation agent for this invention is an acyl sulfate selected from the group consisting of benzoyl, acetyl, propionyl and butyryl sulfate. The acyl sulfate can be formed in situ in the reaction medium or pregenerated before its addition to the reaction medium in an aliphatic or chlorinated aliphatic hydrocarbon.

It should be pointed out that neither the sulfonating agent nor the manner of sulfonation is critical, provided that the sulfonation method does not degrade the polymer backbone. The reaction is quenched with an aliphatic alcohol, such as methanol, ethanol or isopropanol, with an aromatic hydroxyl compound, such as phenol, a cycloaliphatic alcohol, such as cyclohexanol or with water. The acid form of the sulfonated elastomeric polymer has about 4 to about 200 meq. $SO_3H$ groups per 100 grams of sulfonated polymer, more preferably about 10 to about 100, and most preferably about 10 to about 50. The meq. of $SO_3H/100$ grams of polymer is determined by both titration of the polymeric sulfonic acid and Dietert Sulfur analysis. In the titration of the sulfonic acid the polymer is dissolved in solvent consisting of 95 parts of toluene and 5 parts of methanol at a concentration level of 50 grams per liter of solvent. The acid form is titrated with ethanolic sodium hydroxide to an Alizarin-Thymolphthale end-point.

The acid form of the sulfonated polymer is gel-free and hydrolytically stable. Gel is measured by stirring a given weight of polymer in a solvent comprised of 95 toluene-5-methanol at a concentration of 5 weight percent for 24 hours, allowing the mixture to settle, withdrawing a weighted sample of the supernatant solution and evaporating to dryness.

Hydrolytically stable means that the acid function, in this case the sulfonic acid, will not be eliminated under neutral or slightly basic conditions to a neutral moiety which is incapable of being converted to highly ionic functionality.

Neutralization of the acid form of the sulfonated elastomeric polymer is done by the addition of a solution of a basic salt to the acid form of the sulfonated elastomeric polymer dissolved in the mixture of the aliphatic alcohol and non-reactive solvent. The basic salt is dissolved in a binary solvent system consisting of water and/or an aliphatic alcohol. The counterion of the basic salt is selected from antimony, iron, aluminum, lead, or Groups IA, IIA, IVA, VA, VIA, VIIA, VIIIA, IB or IIB of the Periodic Table of Elements and mixtures thereof. The anion of the basic salt is selected from a carboxylic acid having from about 1 to about 4 carbon atoms, a hydroxide, or alkoxide and mixtures thereof. The preferred neutralizing agent is a metal acetate, more preferably transition metal salts, such as zinc acetate. Sufficient metal salt of the carboxylic acid is added to the solution of the acid form of the elastomeric polymer to effect neutralization. It is preferably to neutralize at least 95% of the acid groups, more preferably about 98%, most preferably 100%.

We have surprisingly found that a very important factor in determining the strength of the interaction between the amine-containing polymer and the sulfonate-containing polymer is the nature of the counterion. There are, broadly speaking, three major classes of such counterions. The first class, which are less preferred, are those metals of Group IA and Group IIA, which include Li, Na, K, etc., Be, Mg, Ca, etc. We have found that these species do not interact as strongly with amine groups as the more preferred species described below. Those metals are commonly defined as members of the transition elements (see chemical test: *Chemical Principles and Properties*, by M. J. Sienko and R. A. Plane, McGraw Hill Book Co., 1974, page 19). These metal cations are best exemplified by zinc and interact strongly with pyridine and similar amines. As a consequence, a zinc neutralized sulfonated polymer interacts much more strongly with a styrene/vinyl pyridine copolymer than does a magnesium or sodium neutralized system. It is for this reason that the transition elements are preferred, with zinc, copper, iron, nickel, mercury, cadmium and cobalt being especially preferred. We also include antimony and lead as suitable cations. Other suitable counterions are titanium, vanadium and chromium.

A third species is the free acid of the sulfonated polymer, which will also interact with amine-containing polymers. In this later case, it is clear that the interaction is a classic acid-base interaction, while with the transition metals a true coordination complex is created, which is due to the donation of the electron pair of the nitrogen element. This distinction is a very important one and sets these complexes apart from classic acid-base interactions. The surprising observation is that such coordination complex can form in such extreme dilution insofar as interacting groups are concerned, and that they are apparently formed so far removed from their expected stoichiometry (based on small molecule analogs). In the case of acid-base adducts, this invention covers specifically the acid form of sulfonated EPDM and the acid form of sulfonated butyl. These systems contain the low levels of acid groups coupled with the saturated polymer backbones which combine to make the acid-base adducts especially preferred.

A variety of polymer backbones will display the desirable properties discovered in this invention:

| Sulfonate Containing Polymers | Amine Containing Polymers |
|---|---|
| (A) Elastomers | Styrene/Vinyl Pyridine Copolymer |
| Sulfonated EPDM | |
| Sulfonate Isoprene Copolymers | Vinyl Pyridine/Styrene/ Butadiene Terpolymers |
| Sulfonate SBR Polymers | Isoprene/Vinyl Pyridine Copolymer |
| Sulfonated Butadiene Polymers | Ethylacrylate/Vinyl Pyridine Copolymer and |
| Sulfonated Butyl | Alkyl Acrylate Copolymers with Vinyl Pyridine, where the Alkyl Group Varies in Carbon Number From 1 to 18 |
| Sulfonate-Containing Acrylate and Methacrylate Copolymers | |
| Sulfonated Block Polymers | |
| (B) Plastics | |
| Sulfonated Polystyrene | Methyl Methacrylate/ Vinyl Pyridine Copolymer and Alkyl Methacrylate Copolymers with Vinyl Pyridine, Wherein the Number of Carbon Groups in the Alkyl Group Varies From 1 to 18 carbon atoms. Butadiene/Vinyl Pyridine Copolymer |
| Sulfonated Poly t-butyl styrene | |
| Sulfonate-Containing Polyethylene | |
| Sulfonate-Containing Copolymers of the Above Neutral Monomers | |

| Sulfonate Containing Polymers | Amine Containing Polymers |
|---|---|
| | Propylene/Vinyl Pyridine Block Copolymer Ethylene/Vinyl Pyridine Block Copolymer t-Butyl Styrene/Vinyl Pyridine Copolymers Vinyl Pyridine Copolymers with Alpha-Beta Ethylenically Unsaturated Copolymers or Terpolymers |

Other sulfonate polymers that are useful in this invention include sulfonated polyisobutylene, where these polymers have unsaturation at the ends of the polymer chains. The preparation of such polymers has been described by J. P. Kennedy, et al. [Polymer Bulletin, 8, 821 (1982)]. These polymers are encompassed within the scope of this invention.

The amount of vinyl pyridine in the amine-containing polymer can vary widely, but should range from less than 50 weight percent down to at least 0.5 weight percent.

Preferably, the amine content in the basic polymer is expressed in terms of basic nitrogen. In this respect the nitrogen content in amides and similar non-basic nitrogen functionality is not part of the interacting species.

A minimum of three basic groups must be present on the average per polymer molecule and the basic nitrogen content generally will range from 4 meq. per 100 grams of polymer up to 500 meq. per 100 grams. A range of 8 to 200 meq. per 100 grams is preferred.

A means of characterizing the apparent molecular weight of a polymer involves the use of melt rheological measurements. For ionic polymers this is the preferred method since solution techniques are difficult to interpret, due to the complex nature of the ionic associations. Melt rheological measurements of apparent viscosity at a controlled temperature and shear rate can be used as a measure of apparent molecular weight of an ionic polymer. Although the exact relationship betwen melt viscosity and apparent molecular weight for these ionic systems is not known, for the purposes of this invention the relationship will be assumed to be one of direct proportionality. Thus, in comparing two materials, the one with the higher melt viscosity will be associated with the higher apparent molecular weight.

The melt viscosity of the systems investigated where determined by the use of an Instron Capillary Rheometer. Generally, the melt viscosity measurements were made at a temperature of 200° C. and at various shear rates corresponding to crosshead speeds from 0.005 inches per minute to 20 inches per minute. The apparent viscosity at 200° C. and at a shear rate of 0.73 $sec^{-1}$ (0.005 inches per minute) is employed as a characterization parameter in this invention. A measure of the melt elasticity of a given system can also be obtained from these rheological measurements. A type of flow instability known as melt fracture is exhibited by many polymeric materials of high molecular weight. This phenomenon is shear sensitive and, thus, will generally exhibit itself at a given shear rate and temperature. The shear rate for the onset of melt fracture indicates the upper shear rate for processing a given material. This is used as a characterization parameter for compounds employed in extrusion processing.

To the polymer complex can be added a preferential plasticizer selected from the group consisting of carboxylic acids having about 5 to about 30 carbon atoms, more preferably about 8 to about 22 carbon atoms, or basic salts of these carboxylic acids wherein the metal ion of the basic salt is selected from the group consisting essentially of aluminum, ammonium, lead or Groups IA, IIA, IB or IIB of the Periodic Table of Elements and mixtures thereof. The carboxylic acids are selected from the group consisting essentially of lauric, myristic, palmitic or stearic acids and mixtures thereof, e.g., zinc stearate, magnesium stearate or zinc laurate.

The preferential plasticizer is incorporated into the polymer complex at about 1 to about 30 parts by weight based on 100 parts of the sulfonated polymer complex, more preferably at about 5 to about 25, and most preferably at about 7 to about 20. The metallic salt of the fatty acid can also be used as neutralizing agent. In the case of the neutralizing agent and plasticizer being the identical chemical species, additional metallic salt is added over the required levels of neutralization. Alternatively, other preferential plasticizers are selected from organic esters, phenols, trialkyl phosphates, alcohols, amines, amides, ammonium and amine salts of carboxylic acids and mixtures thereof. The preferred plasticizers are selected from fatty acid or metallic salts of fatty acid and mixtures thereof.

The vinyl monomer-vinyl pyridine polymers of the polymer complex are formed by free radical copolymerization using techniques well-known in the polymer literature. Such polymers can be prepared by a variety of techniques with styrene, t-butyl styrene, alkyl acrylates, alkyl methacrylates, butadiene, isoprene vinyl chloride, acrylonitrile, acrylonitrile/butadiene/styrene monomer mixtures and copolymers, or more complex mixtures. An emulsion polymerization process is generally preferred, but other processes are also acceptable.

The polymer complex is formed by techniques well-known in the art. One approach is to simply blend the polymers dissolved in a suitable common solvent and recover the polymer complex by techniques well-known in the art. While this is a satisfactory process for preparing small amounts of complex, melt blending techniques are preferred. For example, the two polymers can be compounded on a two-roll mill to form the polymer complex. Other methods known in the art which are suitable for making these compositions include those methods employed in the plastic and elastomer industries for mixing polymer systems. An excellent polymer blend composition of this invention can be obtained through the use of a high shear batch intensive mixer called the Banbury. Alternatively, economic advantages in terms of time and labor savings can be obtained through the use of a Farrel Continuous Mixer, a twin screw extruder or tandem extrusion techniques which are continuous mixing types of equipment. The Banbury mixing device is the preferred batch-type mixer and the twin screw extruder is the preferred continuous mixer. The filler and non-polar process oil can be compounded into the polymer complex by the aforementioned process subsequent to the formation of the polymer complex. The bitumen compositions of the instant invention can be prepared by adding the preformed complex polymer to the hot liquid bitumen or adding the two polymers separately into the bitumen.

The resultant polymer complex has a viscosity at 200° C. and a shear rate of 0.73 $sec^{-1}$ of about 5,000 poise to about $5 \times 10^7$ poise, more preferably of about 20,000 poise to about $2 \times 10^6$ poise and most preferably of about 50,0o00 poise to about $5 \times 10^6$ poise. Preferably, both Typical fillers employed in this invention are illustrated in Table I.

TABLE I

| Filler | Code No. | Oil Adsorption Grams of Oil/100 Grams of Filler | Specific Gravity | Average Particle Size Micron | pH |
| --- | --- | --- | --- | --- | --- |
| Calcium Carbonate Ground | Atomite | 15 | 2.71 | 2–10 | 9.3 |
| Calcium Carbonate Precipitated | Purecal U | 35 | 2.65 | .03–.04 | 9.3 |
| Delaminated Clay | Polyfil DL | 30 | 2.61 | 4.5 | 6.5–7.5 |
| Hydrated Clay | Suprex | | 2.6 | 2 | 4.0 |
| Calcined Clay | Icecap K | 50–55 | 2.63 | 1 | 5.0–6.0 |
| Magnesium Silicate | Mistron Vapor | 60–70 | 2.75 | 2 | 9.0–7.5 |
| Ground Silica Quarzmehl (in Germany) | | 30 | 2.32–2.65 | 1–10 | 6.5–7.5 | the neutralized sulfonated polymer and the basic nitrogen-containing polymer are elastomeric and either can be the major component of the polymer complex. Alternatively, one component can be elastomeric and the other can be plastic. Both components cannot be rigid plastics for the purpose of this invention. Finally, a process known as dry blending can be employed wherein the components are employed as face flowing powders.

Bitumen, i.e., bituminous crude petroleum residue, is obtained by removal of volatile constituents of crude petroleum, usually by distillation. This distillation is normally conducted at atmospheric pressure, followed by reduced pressure treatment. The bituminous residue remaining after the reduced pressure treatment is referred to as a vacuum residue.

Bitumen is commonly classified by penetration grade. The penetration of bitumen is a measure of is resistance to deformation and is the depth, expressed in 0.1 mm, which a needle of standardized dimensions penetrates under standardized conditions into this bitumen. The values of the penetration mentioned in this specification are those determined by means of ASTM method D-5.

Bitumens having a penetration ranging from 5 to 200 at 25° C. may be regarded as relatively hard. Preferred bitumens for use in the compositions of this invention have penetration of 100 to 300 at 25° C., e.g., 200 at 25° C.

The polymer complex is incorporated in the bitumen-containing composition in minor proportion by weight, preferably about 1 to about 20 parts by weight per 100 parts by weight of the bitumen; for example, about 10 parts by weight.

To the blend compositions of the bitumen and the polymer complex is optionally added at least one filler which is selected from the group consisting of talcs, ground calcium carbonate, water precipitated calcium carbonate, delaminated, calcined or hydrated clays, silicas, ground slate stone or other ground minerals and carbon blacks and mixtures thereof. These fillers are incorporated into the blend composition at about 0 to about 100 parts by weight per 100 parts by weight of the bitumen, more preferably at about 10 to about 50, and most preferably at about 20 to about 35. Typically these fillers have a particle size of about 0.03 to about 20 microns, more preferably about 0.3 to about 10 and most preferably about 0.5 to about 10. The oil adsorption as measured by grams of oil absorbed by 100 grams of filler is about 10 to about 100, more preferably about 10 to about 85 and most preferably about 10 to about 75.

The bitumen, polymer complex and fillers are readily blended by techniques well-known in the art. At elevated temperatures when the bitumen viscosity is low a propeller or turbine mixer can be used. For higher viscosity a ribbon blender or other blenders that are used for viscous materials can be used. For example, the blend composition can be compounded on a two-roll mill. Other methods known in the art which are suitable for making these compositions include those methods employed in the plastic and elastomer industries for mixing polymer streams. An excellent polymer blend composition of this invention can be obtained through the use of a high shear batch intensive mixer, e.g., a Banbury mixer. Alternatively, economic advantages, in terms of time and labor savings, can be obtained through the use of a Farrel Continuous Mixer, a twin screw extruder or tandem extrusion techniques, which are continuous mixing types of equipment.

It has been found that compared with bitumen alone the composition of the invention has increased softening point and, in fact, softening points of greater than 100° C. can be achieved. Also, the penetration index is greatly improved. Also, it has been found that the compositions of the invention have penetrations close to those of oxidized bitumens.

Furthermore, it has been found that the elastic recovery after stretching is good and, in fact, recoveries as high as 80–90 percent have been achieved. This compares with conventional oxidized bitumens which have no elastic recoveries. However, the presence of the polymer complex in the composition does increase the viscosity, but the latter is low enough at normal processing temperatures.

Also, it has been observed that at high strains, e.g., of the order of 50 percent, the compositions of this invention are not destroyed and the developed strength is characteristic of a flexible product.

DESCRIPTION OF THE PREFERRED EMBODIMENTS

The following Examples illustrate the present invention without, however, limiting the same hereto.

EXAMPLE 1

Asphalt was blended with 7.5 weight percent polymer using a Moritz blender at about 180° C. for 1 to 2 hours. Samples were cast for the various measurements described below.

A. Materials

The asphalt used was a 170 penetration stock (at 25° C.). It was prepared by premixing 40 parts of oxidizing flux with 60 pars of emulsion (EM) flux from heavy Arabian crude.

Zinc-Sulfo-EPDM (TP-314X) had 20 meq. sulfonation level per 100 grams of EPDM backbone. The backbone was about 90,000 weight average molecular weight with 75 weight percent ethylene and 5% ENB (5-ethylidene-2-norbornene).

Amine-containing polymers were copolymers of 4-vinylpyridine with styrene or with tertiary-butyl-styrene or with lauryl-methacrylate. These copolymers are designated SVP, TBSVP and LMVP, respectively. Their blends with sulfo-EPDM are designated TP-314X/SVP, TP-314X/TBSVP and TP-314X/LMVP. Vinyl pyridine content was about 2–15 mole percent.

B. Blending

A Moritz blender was placed in a 1 liter glass beaker containing about 660 grams of asphalt. The asphalt was preheated to about 180° C. under a $N_2$ blanket. Polymer, equivalent to 7.5 weight percent of the total mix, was dry blended from the chosen ingredients and added to the asphalt under stirring over about 30 minutes. Mixing continued for 1–2 hours after polymer addition until the blend appeared homogeneous. Samples were then taken for penetration and softening point tests and a thin pad (2–4 mm thick) was prepared by casting into a mold which was preheated to 150° C.

C. Testing

The following measurements were done on the polymer-asphalt blends:

Penetration at 25° C., following ASTM D-5 using a 100 gram total weight.

Softening point by ring and ball, following ASTM D-36.

Elastic recovery. This is the amount a strip of material recovered after it was exposed to a 50% strain for 24 hours and allowed to recover for 24 hours after unloading. Recovery is expressed in percent such that a perfectly elastic material recovers 100% and a viscous material which does not recover yields a 0% value.

Melt viscosity. This was measured in a melt indexer, such as used in the plastics industry, with a standard die (0.0825/0.315 inch D/L). The chamber was heated to 120° C. and molten asphalt blends were extruded through the die under the weight of the plunger only (326.26 g) which corresponds to a pressure drop of 6.51 psi. The results are expresss in flow rate units of grams per minute, which are proportionally inverse to viscosity.

D. Results

Blends which were prepared at a total polymer concentration of 7.5 weight percent were tested and the results are shown in Table II.

TABLE II

| Polymer | Penetration 25° C. | Softening °F. | ER % | Melt Flow, g/min. |
|---|---|---|---|---|
| TP-314X | 51 | 205 | 80 | 2.6 |
| TP-314X/SVP (80/20) | 60 | 186 | 69 | 4.2 |
| TP-314X/TBSVP (80/20) | 55 | 184 | 70 | 8.8 |
| TP-314X/LMVP (80/20) | 60 | 192 | 71 | 4.5 |

The complex with poly(styrene vinylpyridine) resulted in a nonhomogeneous blend. However, the other two complexes yielded homogeneous blends which were easier to blend and cast than the blend with Sulfo-EPDM alone, as can be seen from the higher melt flow for the complexes. The blends based on complexes displayed good elastic recovery properties and a high softening point relative to the higher 25° C. softness. Therefore, the balance of low temperature softness with good elasticity, lower melt viscosity and high softening point can be advantageous.

Since many modifications and variations of this invention may be made without departing from the spirit or scope of the invention, it is not intended to limit the spirit or scope hereof to the specific Examples.

What is claimed is:

1. A bitumen-containing composition which comprises;
   (a) bitumen;
   (b) about 0.5 to about 30 parts by weight of a polymer complex per 100 parts by weight of the bitumen, wherein said polymer complex having a viscosity at 200° C. and a shear rate of 0.73 sec$^{-1}$ of about 5,000 to about $5 \times 10^7$ poise comprises the blend of a neutralized sulfonated polymer containing from about 4 meq. of metal sulfonate per 100 grams of polymer up to 200 meq. of metal sulfonate per 100 grams of polymer, said sulfonate polymer being at least 95% neutralized, complexed with a second polymer containing basic nitrogen atoms with pyridine copolymerized or grafted thereon, said polymer containing basic nitrogen from about 4 meq. up to 500 meq. per 100 grams of polymer, wherein the molar ratio of metal sulfonate groups to that of basic nitrogen atoms varies from about 0.03 to about 30, wherein said neutralized sulfonated polymer has a backbone selected from the group consisting of Butyl rubber and EPDM terpolymer and said basic nitrogen atom containing polymer is a copolymer of styrene or a styrene derivative and vinyl pyridine; and
   (c) about 0 to about 100 parts by weight of a filler per 100 parts by weight of the bitumen.

2. A composition according to claim 1 wherein said sulfonated groups are neutralized with a counterion being selected from the group consisting of the transition elements of the Periodic Table of Elements, Groups IVA to IIB, including scandium, titanium, vanadium, chromium, manganese, iron, cobalt, nickel, copper, mercury, cadmium and zinc, as well as the subgroups typically associated with the aforementioned transition elements.

3. A composition according to claim 1 wherein sulfonated groups are neutralized with a counterion being selected from the group consisting of antimony, iron, aluminum, lead and Groups IA and IIA of the Periodic Table of Elements and mixtures thereof.

4. A composition according to claim 1 wherein said filler has a particle size of about 0.03 to about 20 microns.

5. A composition according to claim 1 wherein the neutralized sulfonated polymer is based on EPDM, the counterion is zinc, the sulfonate level ranges from 10 meq. up to 50 meq. per 100 grams, the amine-containing polymer is based on a copolymer of styrene and vinylpyridine, and the pyridine level ranges from about 5 meq. per 100 gram up to about 200 meq. per 100 grams.

6. A composition according to claim 1 wherein said filler has an oil adsorption of about 10 to about 100.

7. A composition according to claim 1 wherein said filler is selected from the group consisting of clay, talc or calcium carbonate and mixtures thereof.

8. A composition according to claim 1 wherein said neutralizied sulfonated polymer is a zinc sulfonated EPDM terpolymer and said second polymer is a copolymer of styrene 14-vinyl pyridine.

* * * * *